United States Patent [19]

Nordmann

[11] 4,373,892
[45] Feb. 15, 1983

[54] APPARATUS FOR PREPARING BREAD DOUGH

[76] Inventor: Joseph Nordmann, 3659 Paramount Ridge La., Cincinnati, Ohio 45239

[21] Appl. No.: 338,209

[22] Filed: Jan. 11, 1982

[51] Int. Cl.³ .......................... A21C 3/04; A21C 3/10; A21C 3/02; A21C 11/10

[52] U.S. Cl. ..................................... 425/207; 425/297; 425/305.1; 425/308; 425/315; 425/324.1; 425/363; 425/377; 425/403.1

[58] Field of Search ............ 425/289, 296, 297, 302.1, 425/305.1, 308, 312, 315, 363, 324.1, 383, 376 R, 377, 403, 200, 201, 207, 307, 403.1; 426/19

[56] References Cited

U.S. PATENT DOCUMENTS

| | | | |
|---|---|---|---|
| 1,900,607 | 3/1933 | Kremmling | 425/308 |
| 2,162,079 | 6/1939 | Grabowski et al. | 425/302.1 |
| 2,740,362 | 4/1956 | Elliott | 425/308 |
| 2,951,456 | 9/1960 | Olgiati | 425/367 |
| 3,347,183 | 10/1967 | Einstein et al. | 425/363 |
| 3,596,613 | 8/1971 | Roth | 425/305 |
| 3,880,069 | 4/1975 | Moline | 425/296 |

*Primary Examiner*—Willard E. Hoag
*Attorney, Agent, or Firm*—Frost & Jacobs

[57] ABSTRACT

Apparatus for preparing bread dough comprises a hopper for bulk dough, a rotary pump communicating with the hopper, a die through which dough is extruded by the pump in a continuous ribbon, conveyor means for receiving and conducting the ribbon of dough in succession through proofing means, guide rolls, means for cutting the ribbon of dough into individual pieces, means to roll the individual pieces into cylindrical shapes, and means to divide the cylindrical shapes into at least two further pieces. High production is achieved with a minimum of labor, and excessive working and kneading of the dough are avoided.

10 Claims, 1 Drawing Figure

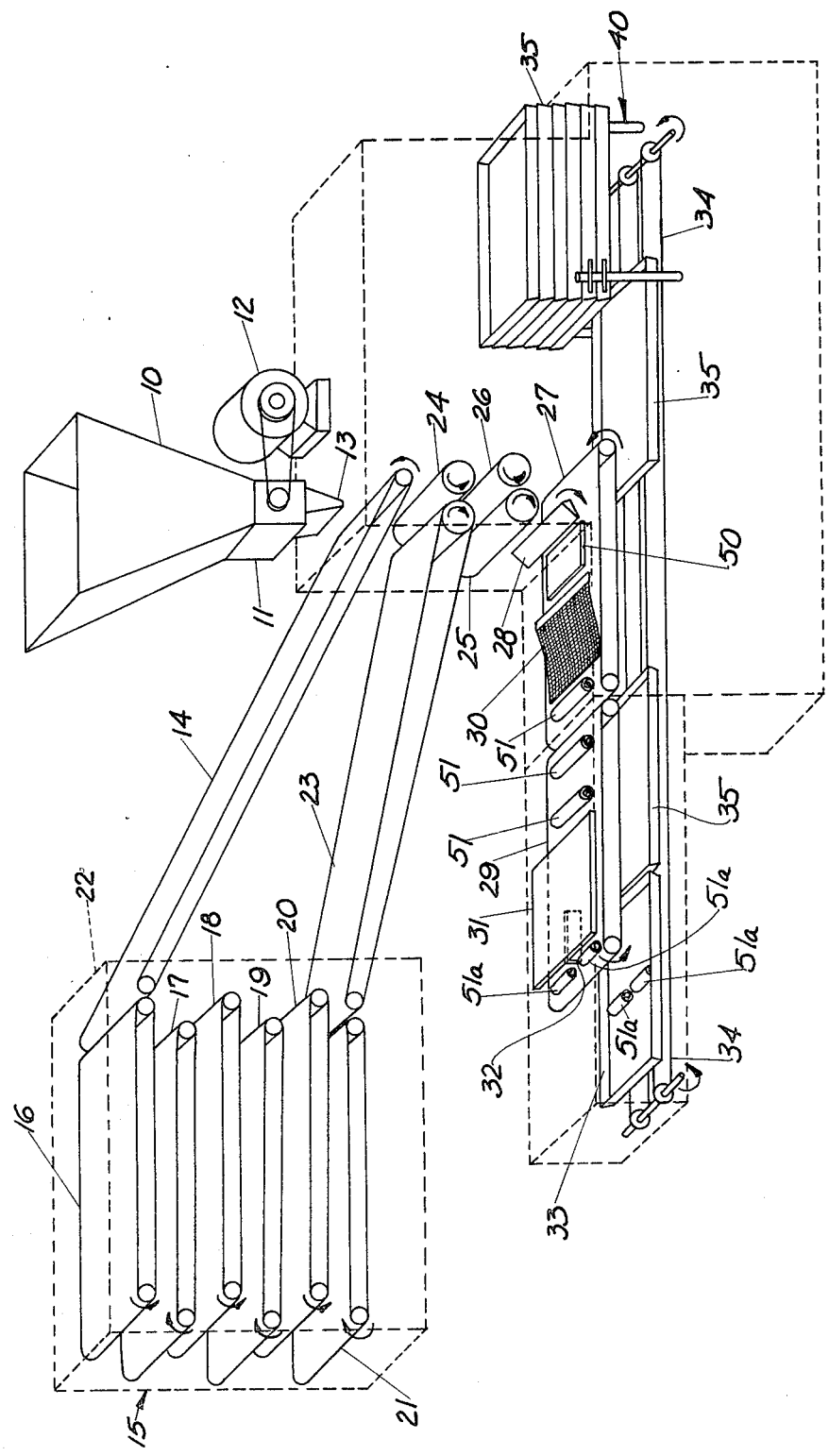

APPARATUS FOR PREPARING BREAD DOUGH

BACKGROUND OF THE INVENTION

This invention relates to apparatus for preparing bread dough for baking by feeding, dividing and panning the dough without excessive working and kneading thereof. More particularly, the apparatus of the invention is capable of high volume production with only two operators, and eliminates the conventional divider or scaler, and rounder needed in automatic bread making equipment. At the same time proofing of the dough is effected at least in part, thus avoiding the use of chemical additives which are considered objectionable by many purchasers.

In the conventional production of bread by automatic machinery four operators are ordinarily needed, the operation starting with dividing or scaling bulk dough into individual pieces of the desired weight, followed by rounding the individual pieces, proofing and molding. The molded pieces are then placed in pans for baking. Machinery presently available for effecting the above steps is bulky, expensive, time-consuming and labor intensive.

Various prior art attempts at improvement of the above-described operation have been made. Reference may be made to U.S. Pat. Nos. 2,740,362; 2,951,456 and 3,347,183. In these patents bulk dough is formed into a continuous ribbon, cut into desired lengths and conveyed through various subsequent operations.

U.S. Pat. No. 2,740,362 discloses apparatus which is alleged to eliminate rounding, proofing and molding, but this is accomplished by use of a solution containing an oxidizing agent or yeast food, such as bromate, sodium metavanadate, sodium chlorite, and/or carbonated water.

U.S. Pat. No. 2,951,456 provides an elongated tapered hopper having a reduced opening at the lower end, means for introducing compressed air or other pressure medium into the hopper above the bulk dough for extrusion thereof through the reduced opening under great pressure.

U.S. Pat. No. 3,347,183 discloses apparatus for metering bulk dough into "slugs" of desired size, including opposed rollers to knead the dough, a pair of forming rollers comprising a channeled roller and a pressure roller, and cutting means to cut the formed dough into a plurality of slugs.

It is a principal object of the present invention to provide apparatus for preparing bulk dough for baking which eliminates chemical conditioners or oxidizing agents, the use of highly pressurized vessels with their consequent danger, and excessive kneading and working of the dough between rollers under pressure.

It will be understood that this invention is not concerned with the initial mixing or preparation of the bulk dough or the baking thereof after dividing and panning.

According to the invention there is provided an apparatus for preparing bread dough which comprises a downwardly tapering hopper for bulk dough, a rotary pump beneath said hopper, a die through which dough is extruded by said pump in a continuous ribbon, first conveyor means for receiving said ribbon of dough from said die, proofing means through which said ribbon of dough is conducted for a predetermined period of time, second conveyor means for receiving said ribbon of dough from said proofing means, guide rolls for conducting said ribbon of dough through a substantially vertical path of travel, substantially horizontal conveyor means for receiving said ribbon of dough from said guide rolls, means for cutting said ribbon of dough into individual pieces of predetermined length while traveling on said horizontal conveyor means, means to roll said individual pieces into cylindrical shapes with the axes thereof transverse to the direction of travel of said horizontal conveyor means, means to divide said individual pieces into at least two further pieces of substantially equal size, and means to convey and position a pan beneath the end of said horizontal conveyor means to receive said pieces of dough.

BRIEF DESCRIPTION OF THE DRAWING

The drawing is a diagrammatic plan view of apparatus for preparing bread dough embodying the invention.

DETAILED DESCRIPTION

Referring to the drawing apparatus in accordance with the invention comprises a hopper 10 for receiving a supply of bulk dough. Preferably the hopper 10 is downwardly and inwardly tapering so as to communicate with a rotary pump 11. Good results have been obtained with a rotary pump manufactured by Crepaco, Inc., CP No. 3R1. Pump 11 is driven by an electric motor 12 having a suitable belt or chain drive. Such a pump discharges a continuous ribbon of dough without exerting undue pressure or excessive working thereon, and the ribbon is extruded through a die 13. For dough being prepared for one pound loaves of bread, the ribbon extruded through die 13 may be about 4 inches wide and one half inch thick, but it will be understood that different widths and thicknesses may be used for other types of baked products.

The continuous ribbon of dough extruded through die 13 is received on a first conveyor means 14 which is upwardly inclined and which conducts the continuous ribbon to a proofing means indicated generally at 15. The proofing means comprises a plurality of superposed generally horizontal conveyor belts, six being shown by way of example in the drawing as belts 16-21, respectively. The belts are arranged in parallel spaced relation to one another, and each belt is adapted to move in a direction opposite to the direction of movement of the adjacent belts, with the uppermost belt 16 moving in the same direction of travel as first conveyor means 14. It will be noted further that the superposed conveyor belts are arranged in staggered relation to one another in order that the continuous ribbon will be deposited on each succeeding lower belt and move in the opposite direction, thereby conducting the continuous ribbon in a sinuous path of travel.

The continuous ribbon of dough exits the proofing means 15 from the lowermost conveyor belt thereof and is delivered to a second conveyor means 23 moving in the same direction as the lowermost belt of the proofing means, the second conveyor means 23 preferably being downwardly inclined.

The first conveyor means 14, the conveyor rolls 16-21 and the second conveyor means 23 are preferably driven by a single electric motor (not shown) and all travel at the same rate of speed by means of suitable belt or chain drives (not shown). The speed of travel of these belts may be varied by a controller such as a rheostat connected to the drive motor in order to vary the production rate and the time interval for passage of the dough through the proofer 15. It will of course be understood that the time interval in the proofer may also be varied by increasing or decreasing the number of horizontal conveyor belts therein upon which the dough is conducted in a sinuous path of travel.

Similarly, a rheostat is provided in connection with drive motor 12 for rotary pump 11 in order to vary the rate at which dough is extruded through die 13. Individual speed controls on drive motor 12 and the motor driving first conveyor means 14, horizontal belts 16–21 in proofer 15 and second conveyor means 23 make possible optimum variation in production rates and accommodation for different widths and thicknesses of the continuous ribbon of dough.

Proofing means 15 is preferably provided with an enclosure indicated at 22 in broken lines to control temperature and humidity within proofing means 15 and to ensure cleanliness.

The continuous ribbon of dough is conducted by the second conveyor means 23 past a counter rotating roll 24 positioned at a slightly higher level than the discharge end of the belt on conveyor means 23 in order to divert the continuous ribbon of dough into a substantially vertical path of travel downwardly, and the ribbon of dough then passes between a pair of counter rotating driven guide rolls 25 and 26 spaced apart by a distance sufficient to compress the ribbon of dough slightly upon passage therebetween.

The continuous ribbon of dough then passes from guide rolls 25 and 26 onto the upper surface of a substantially horizontal conveyor belt 27, moving in a direction opposite to the upper flight of second conveyor means 23. A rotatable knife blade 28 is positioned above conveyor 27 with the blade transverse to the direction of travel of the ribbon of dough. The knife blade 28 is rotated at a speed relative to the speed of travel of the ribbon of dough on conveyor 27 such that it will cut the ribbon into individual pieces of desired length, e.g. equal to the amount of dough needed for two loaves of bread. Preferably a separate motor and rheostat control (not shown) are provided for rotation of the knife means 28 in order that the speed of rotation may be controlled independent of the speed of travel of the ribbon of dough on conveyor 27.

A second horizontal conveyor indicated at 29, may be provided aligned in end to end relation with conveyor 27. By thus providing relatively shorts flights between the drive rolls of conveyors 27 and 29, sag in the conveyor belts is minimized.

After the ribbon of dough is cut into individual pieces by rotating knife means 28, one such piece being indicated at 50 in the drawing, the pieces are conducted by conveyor 27 under a "curling chain" indicated at 30. The curling chain is positioned parallel to the upper surface of conveyor 27 and comprises a plurality of flexible chain link or mesh elements the trailing ends of which contact the upper surface of the conveyor belt 27. As the pieces 50 are conducted under the curling chain 30, the weight of the chain links or mesh is sufficient to cause each piece of dough to be rolled up or curled into a substantially cylindrical shape as shown at 51. These are spaced apart at regular intervals on the conveyor surfaces 27 and 29.

Adjacent the end of conveyor flight 29 a planar surface indicated at 31 is provided substantially parallel to the belt of conveyor 29 and positioned above the belt a distance sufficient to admit each successive cylindrical roll of dough 51 and to exert slight pressure thereon insufficient to prevent each roll 51 from being carried in the direction of travel of conveyor 29. Adjacent the trailing edge of the planar surface 31 there is provided at least one downwardly depending cutting surface 32 parallel to the direction of travel of the conveyor which is contacted by each roll of dough 51, thereby further subdividing each roll into two or more sections indicated at 51a, which are of the desired size for baking in the form a loaf. By way of non-limiting example, each piece 51a may be about one pound in weight so as to provide a standard-size loaf upon baking.

After passage beyond the cutting means 32, the loaf-sized pieces 51a drop off the edge of conveyor 29 onto a conventional baking pan or bun pan indicated at 33. Pan 33 is supported on a chain conveyor 34 and an appropriate stop (not shown) is provided adjacent the end of chain conveyor 34 in order to hold pan 33 in position to receive the loaves from conveyor 29. When pan 33 is completely loaded with loaves it is removed manually by an operator and placed in a separate proof box for appropriate further conditioning, if needed, before baking in an oven.

Immediately upon removal of pan 33, the chain conveyor 34 conducts the next in a series of additional pans 35 into position beneath the end of conveyor 29. Adjacent the opposite end of chain conveyor 34 a stack of pans 35 is provided, and mechanism indicated generally at 40 is operative to release one pan at a time downwardly to be conducted by chain conveyor 34 toward the end of conveyor 29.

A main electric motor is provided with a speed controller (not shown) in the form of a rheostat or the like with drive belts or chains to the rolls 24, 25 and 26, the conveyors 27 and 29, the chain conveyor 34 and the pan loader 40. All these elements are thus adapted to operate in timed relation to one another and the rate of travel of, e.g. the conveyors 27 and 29, is related to the rotational speed of the guide rolls 25 and 26 to ensure continuous production.

In summary, the pump 11 is adapted to be operated at a variable speed independent of the other elements. The conveyor 14, the belts 16–21 in the proofer and the conveyor 23 are adapted to be operated at varying speeds independent of the other elements. The guide rolls 24–26, conveyors 27 and 29, conveyor 34 and pan loader 40 are adapted to be operated at variable speeds independent of the other elements. The rotatable knife 28 is adapted to be operated at a variable speed independent of the other elements.

It is apparent from the above description that the present invention achieves the objective of providing apparatus for preparing bulk dough for baking which eliminates the use of highly pressurized vessels, excessive kneading and working of the dough, and a high production rate while at the same time requiring only two operators. The speeds of the various elements can be varied in order to accommodate products of varying sizes, and the time required for preparation can be varied to suit the conditioning of the particular type of dough being prepared for baking.

While a preferred embodiment has been described, the invention is not so limited, and modifications may be made without departing from the spirit and scope of the invention.

I claim:

1. Apparatus for preparing bread dough, comprising a downwardly and inwardly tapering hopper for bulk dough, a rotary pump beneath said hopper communicating therewith, a die through which dough is extruded by said pump in a continuous ribbon, first conveyor means for receiving said ribbon of dough from said die, proofing means through which said ribbon of dough is conducted for a predetermined period of time, second conveyor means for receiving said ribbon of dough from said proofing means, guide rolls for conducting said ribbon of dough through a substantially vertical path of travel, substantially horizontal conveyor means for receiving said ribbon of dough from said guide rolls, means for cutting said ribbon of dough into individual pieces of predetermined length while traveling on said horizontal conveyor means, means to roll said individual pieces into cylindrical shapes with the axes thereof transverse to the direction of travel of said horizontal conveyor means, means to divide said individual pieces into at least two further pieces of substantially equal size, and means to convey and position a pan beneath the end of said horizontal conveyor means to receive said futher pieces of dough.

2. The apparatus claimed in claim 1, wherein said pump is adapted to vary independently the rate of extrusion of said dough.

3. The apparatus claimed in claim 1, wherein the speed of travel of said horizontal conveyor means and said means to convey and position a pan, and the speed of rotation of said guide rolls are adapted to be varied in unison.

4. The apparatus claimed in claim 1, wherein said means for cutting said ribbon of dough is a rotating knife blade disposed transverse to the direction of travel of said ribbon, and wherein the speed of rotation of said rotating knife blade is adapted to be varied independently.

5. The apparatus claimed in claim 1, wherein said means to roll said individual pieces of dough into cylindrical shapes comprises a plurality of flexible chain lengths overlying said horizontal conveyor means.

6. The apparatus claimed in claim 1, wherein said means to divide said individual pieces into at least two further pieces comprises at least one knife blade positioned in close overlying relation to said horizontal conveyor means and parallel to the direction of travel thereof.

7. The apparatus claimed in claim 1, wherein said proofing means comprises a plurality of superposed conveyor belts arranged in parallel spaced relation to one another, each belt being adapted to move in a direction opposite to the direction of movement of adjacent belts, whereby to conduct said ribbon of dough deposited thereon in a sinuous path of travel.

8. The apparatus claimed in claim 7, wherein the speed of travel of said first and second conveyor means and said plurality of superposed conveyor belts is adapted to be varied in unison.

9. The apparatus claimed in claim 1, wherein said means to convey and position a pan comprises a horizontal chain conveyor positioned beneath said horizontal conveyor means and moving in the same direction and in timed relation therewith.

10. The apparatus claimed in claim 9, including means to deposit one tray from a superposed-stack of trays onto said horizontal chain conveyor.

* * * * *